(12) United States Patent
Pugh

(10) Patent No.: US 11,336,792 B1
(45) Date of Patent: May 17, 2022

(54) EXPOSURE CORRECTION OF AN IMAGE TRANSPARENCY

(71) Applicant: KYOCERA Document Solutions Inc., Osaka (JP)

(72) Inventor: Eric Pugh, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/157,854

(22) Filed: Jan. 25, 2021

(51) Int. Cl.
*H04N 1/04* (2006.01)
*H04N 1/028* (2006.01)

(52) U.S. Cl.
CPC ....... *H04N 1/02895* (2013.01); *H04N 1/0288* (2013.01)

(58) Field of Classification Search
USPC ................................................. 358/475, 509
See application file for complete search history.

(56) References Cited

U.S. PATENT DOCUMENTS

| 8,380,043 | B2 | 2/2013 | Saito | |
| 2009/0204291 | A1* | 8/2009 | Cernasov | G02C 7/101 701/36 |
| 2017/0280038 | A1 | 9/2017 | Ai et al. | |
| 2021/0185208 | A1* | 6/2021 | Djakovic | H04N 5/23216 |

* cited by examiner

*Primary Examiner* — Cheukfan Lee
(74) *Attorney, Agent, or Firm* — W. Webostad

(57) ABSTRACT

Systems and methods relate generally to exposure correction of an image transparency. In an example method thereof, an adaptable filter having an adjustable transparency panel and a microcontroller is obtained. The image transparency is backlit to obtain first analog image information by the adaptable filter. An exposure level associated with the first analog image information is sensed. A transparency level of the adjustable transparency panel is adjusted responsive to the sensed exposure level. Second analog image information is obtained from the adjustable transparency panel provided to a sensor array. The second analog image information is the first analog image information with the adjusted transparency level.

20 Claims, 10 Drawing Sheets

EXPOSURE CORRECTION OF AN IMAGE TRANSPARENCY

FIELD

The following description relates to correcting exposure. More particularly, the following description relates to exposure correction of an image transparency. Even more particularly, the following description relates to a user interface for exposure correction of an image transparency.

BACKGROUND

Conventionally, correction of film negatives or slides involving both over- and under-exposed regions involved understanding complex software applications. Along those lines, corrections were performed in the digital domain, rather than in the analog domain. However, film negatives and slides conventionally have a higher dynamic range than a conventional scanner, and so correction in a digital domain may involve a significant amount of data loss. While correction involving multiple scans with different backlighting settings has been used to extend dynamic range of an image scanner, still adjustment is performed in a digital domain resulting in data loss with reference to dynamic range of film negatives or slides.

SUMMARY

In accordance with one or more below described examples, a system relating generally to exposure correction of an image transparency is disclosed. In such a system, there is a light source. An adaptive filter has an adjustable transparency panel and a microcontroller coupled for communication with the adjustable transparency panel to adjust a transparency level of the adjustable transparency panel. A transparency holder is positioned between the light source and the adaptive filter. The transparency holder is configured to hold the image transparency backlit by light from the light source to obtain first analog image information. The adaptive filter is configured to sense an exposure level associated with the first analog image information to provide a sensed signal to the microcontroller. The microcontroller is configured to adjust the transparency level of the adjustable transparency panel responsive to the sensed signal. A sensor array is configured to receive second analog image information output from the adjustable transparency panel. The second analog image information is the first analog image information after being adjusted by the adjustable transparency panel.

In accordance with one or more below described examples, a method relating generally to exposure correction of an image transparency is disclosed. In such a method, an adaptable filter having an adjustable transparency panel and a microcontroller is obtained. The image transparency is backlit to obtain first analog image information by the adaptable filter. An exposure level associated with the first analog image information is sensed. A transparency level of the adjustable transparency panel is adjusted responsive to the sensed exposure level. Second analog image information is obtained from the adjustable transparency panel provided to a sensor array. The second analog image information is the first analog image information with the adjusted transparency level.

In accordance with one or more below described examples, a computer-implemented system relating generally to an image transparency is disclosed. In such a system, there is a display. A memory is configured to store program code and data. At least one processor of a processor system is configured in response to the program code to execute machine executable instructions for displaying a graphical user interface on the display. The displaying of the graphical user interface includes generating an image display window, a virtual slider, a plurality of virtual field-buttons, and a plurality of virtual buttons. The machine executable instructions further include capturing a digital image of the image transparency responsive to assertion of an image capture button of the plurality of virtual buttons. The machine executable instructions further include adjusting an exposure level of at least one region of the digital image responsive to a setting of the virtual slider or an exposure virtual field-button of the plurality of virtual field-buttons to adjust a transparency level of an adaptive filter.

In accordance with one or more below described examples, a computer-implemented method relating generally to an image transparency is disclosed. In such a method, a graphical user interface is displayed on a display. The displaying of the graphical user interface includes generating an image display window, a virtual slider, a plurality of virtual field-buttons, and a plurality of virtual buttons. A digital image of the image transparency is captured responsive to assertion of an image capture button of the plurality of virtual buttons. An exposure level of at least one region of the digital image is adjusted responsive to a setting of the virtual slider or an exposure virtual field-button of the plurality of virtual field-buttons to adjust a transparency level of an adaptive filter.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block diagram depicting an example of a conventional adaptive filter.

FIG. 2 is a flow diagram depicting an example of an exposure correction flow.

FIG. 8-1 is a block-pictorial diagram depicting another example of a UI.

FIG. 8-2 is a block-pictorial diagram depicting the example of the UI of FIG. 8-1 with an image histogram displayed in an image display window.

FIG. 8-3 is a block-pictorial diagram depicting the example of the UI of FIG. 8-1 with a grid overlay on a captured image displayed in an image display window.

FIG. 8-4 is a block-pictorial diagram depicting the example of the UI of FIG. 8-1 with a user-defined selected image area on a captured image displayed in an image display window for a polygonal area selection mode.

FIG. 8-5 is a block-pictorial diagram depicting an enlarged view of a portion of the UI of FIG. 8-1.

DETAILED DESCRIPTION

Figure 1:
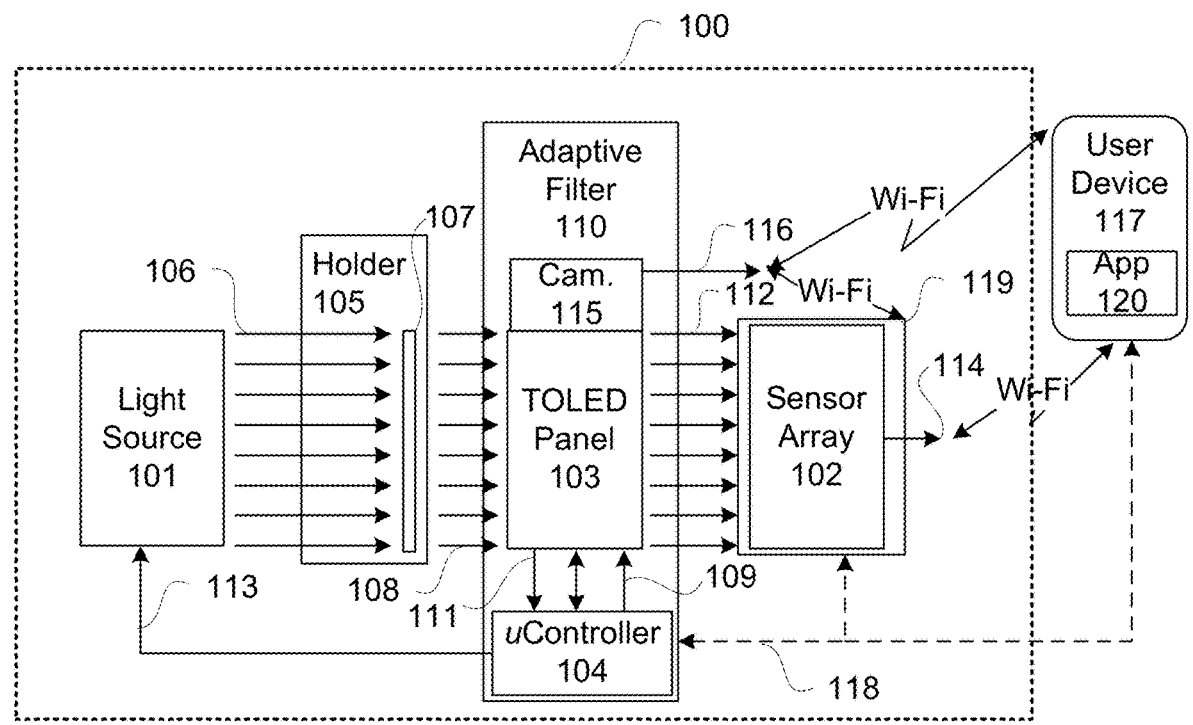
FIG. 1-1 is a block-flow diagram depicting an example of an exposure correction system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As previously indicated, over- or under-exposed slides, film negatives, or other image transparencies, were processed in a digital domain using software applications. As described below in additional detail, an analog-digital hybrid is used to identify over- or under-exposed regions of an image transparency; however, adjustment of such exposures is performed in an analog domain regionally, namely with respect to a subset of an image transparency in contrast to just adjusting backlighting for an entirety of an image transparency. Such exposure adjustment is performed prior to conversion of analog information into digital information with respect to such exposure adjusted analog information.

With the above general understanding borne in mind, various configurations for exposure correction systems, and methods therefor, with image transparency capabilities are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a block-flow diagram depicting an example of an exposure correction system 100. Exposure correction system 100 may be implemented as part of an image scanner with a film/slide assembly. In another example, exposure correction system 100 may be implemented using a digital camera, such as for example a digital single-lens reflex camera ("DSLR"). In yet another example, exposure correction system 100 may be implemented as part of a multi-function printer ("MFP") having a scanner with a film/slide assembly. For purposes of clarity by way of example and not limitation, an MFP implementation is assumed unless otherwise described; however, other types of implementations may be used in accordance with the following description.

Exposure correction system 100 may be used to produce a digitized image output from an analog image transparency 107, which may be a frame of a film, a slide, or other image transparency. More particularly, exposure correction system 100 may be used to produce a digital image output 114 which is an exposure corrected version of an analog image transparency 107.

Exposure correction system 100 may include a light source 101, a transparency holder 105, an adaptive filter 110, and a sensor array 102. In this example, adaptive filter 110 has a transparent organic light-emitting diode ("TOLED") panel ("panel") 103 and a microcontroller 104. However, another type of adaptive filter 110 may be used in another example.

Microcontroller 104 may be coupled for communication with panel 103 to adjust a transparency level of panel 103. Microcontroller 104 may be selected from an electronics platform such as a Raspberry Pi circuit board or an Arduino circuit board for example.

A transparency holder 105 may be positioned between a light source 101 and adaptive filter 110. For an MFP 119, a scanner may have a platen made of a transparent material. In this example, a transparency holder 105 may be laid flat on such platen. This allows for transparency holder 105 to be removed when scanner is used for purposes other than scanning for an image transparency 107.

Transparency holder 105 may be configured to hold image transparency 107 while being backlit by light 106 from light source 101, such as that of a scanner, to obtain first analog image information 108 from image transparency 107. For a scanner, a platen may be a glass or other transparent platen located behind an adaptive filter 110.

Panel 103 may be incorporated into or with transparency holder 105. Along those lines, an adjustable transparency display 121 may be laid flat on a platen between such transparency holder 105 and such platen of an MFP 119.

Adaptive filter 110 may be configured to sense an exposure level associated with first image information 108 to provide a sensed signal 111 to microcontroller 104. This sensed exposure level may be used for initialization of adaptive filter 110. Moreover, this sensed exposure level may be used for an auto correction mode, as described below in additional detail.

Microcontroller 104 and panel 103 may be configured for communication with one another, as well as power and ground, in addition to other signals described herein. For purposes of clarity and not limitation, known signaling is not described in unnecessary detail.

Microcontroller 104 may be programmed and otherwise configured to adjust a transparency level of panel 103 responsive to sensed signal 111. Microcontroller 104 may provide a transparency level adjust signal 109 to panel 103 for such adjustment. This adjustment may be part of an initialization operation of adaptive filter 110. An adjustment responsive to transparency level adjust signal 109 may be used as a baseline to adjust an exposure level of all or one or more subsets of first analog image information 108 in providing second analog image information 112.

In another example, microcontroller 104 may be configured to adjust transparency level of panel 103 with transparency level adjust signal 109 and/or a power level adjust signal 113 provided to light source 101 to adjust a power level thereof responsive to sensed signal 111 to correct for an exposure level of image transparency 107.

As described below in additional detail, a single pass for an exposure adjustment may be provided after initialization. A single pass may be useful for example when processing multiple image transparencies. Along those lines, in another example, transparency holder 105 may be a transparency image feeder capable of loading and unloading image transparencies in succession.

For example, if an entire film/slide image contains both under- and over-exposed regions, microcontroller 104 can configure panel 103 to regionalize transparency to separately adjust for under- and/or over-exposed areas or regions of an image transparency 107, this allows for single pass adjustment without having to perform multiple passes with different amounts of film/slide backlighting and without losing image data. Regionalization of an image transparency 107 for purposes of exposure correction may be responsive to user selection, whether a human or a software application ("app").

Microcontroller 104 may be configured to adjust for over and/or under exposure of an exposure level of an image transparency 107, including an ability to leave one or more region's exposure level unchanged. In this example, sensor array 102 is of an MFP 119; however, in another example, sensor array 102 may be of a digital camera or a standalone scanner for example. In this example, sensor array 102 has a pixel density for at least a 10-bit grayscale for producing digital image output 114. Digital image output 114 may be a color image or a black and white image. For a scanner having sensor array 102, a scanning operation may be used to obtain second analog image information 112 by such sensor array. For a camera having a sensor array 102, a sampling operation may be used to obtain second analog image information 112 by such sensor array.

Both film negative and slide transparencies may have higher dynamic range than a conventional image scanner. Dynamic range for film/slide transparencies are measured in f-stops, f-number or stops, where a stop is defined to be twice the amount of brightness level as measured from the previous setting. The amount of light used to generate a film/slide transparency may be controlled by the aperture of a device used to capture a film/slide transparency. Dynamic range for image scanners is measured by Dmax values, which is a measure of the darkest area of an image that can be scanned by a computer scanner and still show detail.

Film negative and slide transparency have a dynamic range between 5 to 13 stops, while a conventional image scanner has about 2+ stops of dynamic range. When processing dynamic range imperfections in an original film/slide image, microcontroller 104 may adjust power level of light source 101 to increase dynamic range of a scanner of an MFP. Using different backlighting levels to extend an effective dynamic range of scanner having a light source 101 in combination with transparency adjustment of panel 103 may be used to perform a single-pass exposure correction of an image transparency 107. In another example, multiple-pass capture exposure correction of an image transparency 107 may be implemented. However, as multiple-pass exposure correction includes at least one additional iteration of a single-pass exposure correction of an image transparency 107 using a prior result thereof, single-pass exposure correction is described as multiple-pass exposure correction follows therefrom.

By not having to use post-capture software adjustment, the higher dynamic range of an image transparency may be leveraged. Moreover, such exposure adjustment may be automatically performed without user involvement and without having to use specialized post-capture software.

A sensor array 102, such as an imager or image sensor of a charge-coupled device ("CCD") or active pixel sensor ("CMOS") configuration for example, may be configured to receive second analog image information 112 output from panel 103. Sensor array 102 in this example is for a scanner of an MFP 119. However, again a sensor array 102 may be of a DSLR camera or other imaging device 119 in another example. Such second image information 112 may be first image information 108 after being adjusted by panel 103 responsive to transparency level adjustment.

In this example, Wi-Fi is used for communication to an MFP 119 of a captured digital image, such as from optional camera 115, to a separate user device 117 and/or MFP 119. However, in another example, adaptive filter 110 may be coupled to MFP 119 or other sensor array device through an optional communications cable 118. Such a communications cable may be a Universal Serial Bus ("USB") or other communications cable. Furthermore, in another example, adaptive filter 110 may be wired to a separate user device 117 through an optional communications cable 118.

Figures 1, 2:
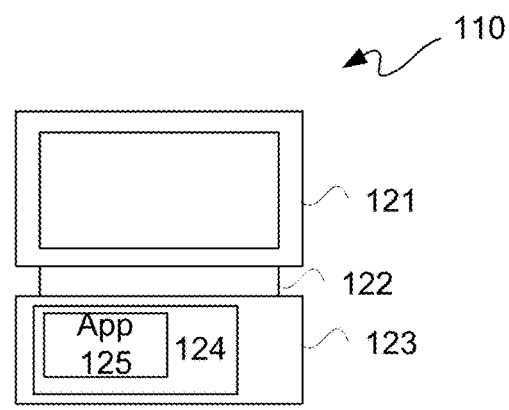
Figure 2:
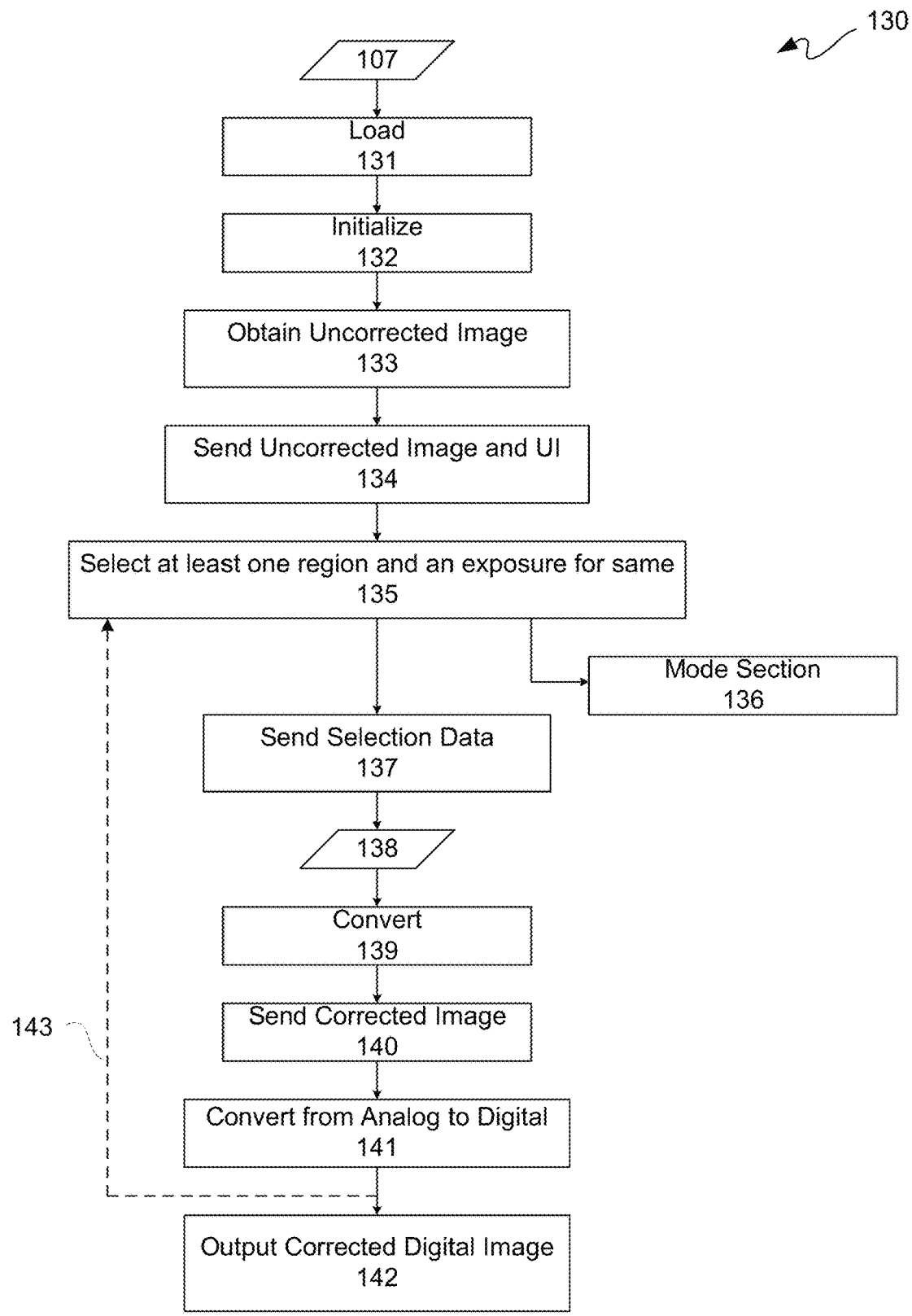

FIG. 1-2 is a block diagram depicting an example of a conventional adaptive filter 110. Adaptive filter 110 includes an adjustable transparency display 121, one or more bussed interfaces 122, a programmed embedded processor 123 and memory 124. Software and hardware of adaptive filter controls the amount of light passing through adjustable transparency display 121 responsive to a transparency level adjust signal. An app 125 stored in memory 124 may be used to control programmed embedded processor 123 and adjustable transparency display 121.

Though an example of an OLED transparent display unit was described above, other types of transparent display units may be used in other examples. Accordingly, this or another example of an adaptive filter 110 may be used.

Returning to FIG. 1-1, optionally added to a conventional adaptive filter 110 may be a camera 115. Camera 115 may be oriented to a side or otherwise offset with respect to adaptive filter 110 so as not to interfere with an image scanner light path. Camera 115 may be W-Fi capable for sending a digital image output 116 of an image transparency 107, as previously described.

FIG. 2 is a flow diagram depicting an example of an exposure correction flow 130. Exposure correction flow 130 is further described with simultaneous reference to FIGS. 1-1 through 2.

At operation 131, an image transparency 107 may be loaded, such as into a holder 105, and backlit such as with a light source 101. At operation 132, an adaptive filter 110 may be initialized. Initialization may include obtaining a sensed signal 111 and providing either or both a transparency level adjust signal 109 and a power level adjust signal 113.

A digital image output 116 from a camera 115 may be obtained from such an adaptive filter 110 without any exposure correction at operation 133. Such a digital image output 116 may be sent to an external display or an integrated display at operation 134 of a separate user device 117. This uncorrected digital image output 116 may have a lower resolution than or a same resolution as a corrected digital image output 114. Such a digital image output 116 may be sent along with a web-based user interface ("UI") by app 125 via Wi-Fi.

Along those lines, a digital image of an image transparency 107 may be viewed by a human user on a display of a separate user device 117, such as a mobile phone, a tablet, a notebook computer, a workstation computer or another display, or on a display of a standalone printer or an MFP 119, in an uncorrected exposure state via digital image output 116, as may be obtained at operation 133 and sent via Wi-Fi by camera 115. In another example, such a digital image output 116 may be sent for non-human processing without having to be viewed on a display. Moreover, a non-human user may obtain image information on a separate user device 117, such as a mobile phone, a tablet, a notebook computer, a workstation computer or another separate programmed computational device, in communication with exposure correction system 100. In another example, a non-human user may obtain image information on a standalone printer or an MFP 119.

For purposes of clarity and not limitation, a separate user device 117 is assumed to be a mobile phone. However, another type of separate user device may be used.

Receipt of an uncorrected for exposure image sent at operation 134 may be used to notify a user's mobile phone 117 that adaptive filter 110 setup or initialization has been completed. In this example, a programmed embedded processor 123 is not in wired communication with an MFP 119 scanner or a mobile phone 117. In this example, an app 125 in communication with programmed embedded processor 123 controls adjustable transparency display 121 and communicates, via Wi-Fi in this example, with a mobile phone 117 and MFP 119. However, in another example, a wired connection or another type of wireless connection may be used.

At operation 135, a user selects one or more regions of image transparency 107 displayed as a digital image output 116 on a mobile phone display to adjust for exposure. Further at operation 135, a user selects an exposure level adjustment or an exposure level for each of such one or more regions selected. This exposure level adjustment may be based on an initialized exposure level, as previously described.

A user may be a human user or an app operating on a mobile phone 117 in communication with exposure correction system 100. A human user may control transmissivity level from a mobile phone 117 programmed with an app by choosing an exposure level when selecting an image region to adjust. However, in this example, app 125 sends a web-enabled interface via Wi-Fi for user selection along with an uncorrected for exposure image, namely digital image output 116, for a web-browser app 120.

In an example with multiple modes, region selection at operation 135 may optionally include mode selection at operation 136. In this example, at operation 136, one of three user input modes may be selected. However, in another example, a single mode, two modes, or more than three modes may be implemented.

For two user input modes in this example, a user may specify an area of an image to adjust, and, in a third input mode in this example, a user may select a mobile phone 117 to operate in auto-learn mode. In an auto-learn mode, past decisions may be used to make exposure adjustments to current images, where such adjustments are performed automatically. For an auto-learn mode, a mobile phone 117 may be programmed with a known app used to store and learn from prior experiences.

In this example, a user may choose to override a mobile phone's auto-learn mode, and thus override automatically selected parameters, with a user supplied region and exposure level selection. In the descriptions below, it is assumed selections are performed by a human user interfacing to a touch display of a mobile phone. However, another type of cursor point device, such as a mouse, trackpad, or other cursor pointing device, may be used in another example, including by an auto-learn app.

At operation 137, user selection data 138 from operation 135 may be sent from a mobile phone 117 to adaptive filter 110. In this example, user selection data 138 is sent by Wi-Fi; however, as previously indicated another form of communication may be used in another example.

At operation 139, programmed embedded processor 123 interfaces with adjustable transparency display 121 to convert user region and exposure level selection data 138 to a set of corresponding display coordinates and a corresponding transmissivity value for adjustable transparency display 121. This adjusts transmissivity of light in such selected region as allowed by adjustable transparency display 121.

Along those lines, under control of app 125, adjustable transparency display 121 may be used to control the amount of light passing through one or more selected regions of first analog image information to a sensor array 102. For example, an MFP scanner CCD may receive different amounts of light for different regions in first analog image information by varying a transmissivity level of adjustable transparency display 121. This variation may be different for different user selected regions corresponding to different user selected exposure levels. Accordingly, using multiple sets of display coordinates for corresponding user selected regions of an image and using multiple corresponding user selected exposure levels, an adjustable transparency display 121 may adjust over exposed, under exposed, or leave unchanged various regions of an image transparency 107.

At operation 140, adaptive filter 110 may send an exposure corrected or compensated version of image transparency 107 or first analog information 108 to sensor array 102 as second analog image information 112. Sensor array 102 may convert such second analog image information 112 to an exposure corrected digital image output 114 at operation 141. At operation 142, such a digital image output 114 may be output, such as for printing, display, faxing, emailing, texting, web-sharing, streaming, or otherwise.

In other example, such an exposure corrected digital image output 114 may be reprocessed by using selections made at operation 135 as baseline selections. Along those lines, such an exposure corrected digital image output 114 at operation 141 may optionally be resent to a user for refinement of selections at operation 135, as generally indicated by dashed line 143.

Figure 3:
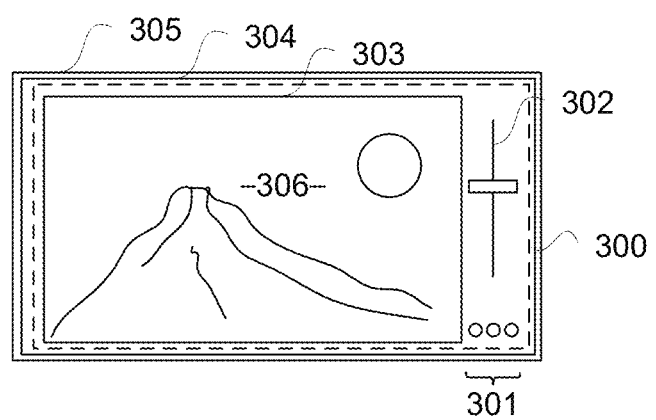
FIG. 3 is a block diagram depicting an example of a user interface ("UI").

FIG. 3 is a block diagram depicting an example of a UI 300. UI 300 is an example or a graphical UI ("GUI"), which is further described with simultaneous reference to FIGS. 1-1 through 3.

UI 300 may be displayed on a screen 304 of a display 305, such as may be included with or coupled to a mobile phone 117 continuing the prior example. However, again, in another example, another type of separate user device may be used. Furthermore, in another example, rather than a separate user device, an integrated device having a scanner and a display, such as an MFP, may be used.

UI 300 may include an image display window 303 and a virtual slider 302. Optionally, UI 300 may include one or more mode select virtual buttons 301. In this example, there are three mode select virtual buttons 301 corresponding to three modes described hereinbelow.

However, virtual buttons 301 need not be present, as tapping a display may be used for mode selection, as described below in additional detail. Along those lines, by using any of the below-described tap or multi-tap options, a device display locks in a current display so that a user can operate on a captured image.

If a general-area-selection mode is selected on a mobile phone, a user may select an area of an image displayed in image display window 303 to adjust. This selection may be made in this example by single-tapping a touch screen display in such image display window 303 area and then selecting a general location on a displayed image 306 therein by touching such area or touch circling such area of such displayed image in image display window 303. For an exposure level, a user may be presented with a virtual slider 302 that can be moved up or down to adjust such exposure level.

From such selections, image location and exposure level data may then be sent at operation for conversion to device hardware, such as via Wi-Fi for example as previously described. A general location within an image may be transformed into a region by using one or more known flood-fill apps or assistance from a known generative-learning or auto-learning app, which may be programmed into a mobile phone 117.

If a polygonal-area-selection mode is selected on a mobile phone 117, a user may select an area of an image by double-tapping a touch screen display in such image display window 303 area and drawing a polygonal outline around such an image area to adjust with a user's finger. This may invoke a slower more granular line drawing of touchscreen hardware and software. In another example, another type of cursor-pointing device may be used. Again, for an exposure level, a user may be presented with a virtual slider 302 that can be moved up or down to adjust such exposure level. From such selections, image location and exposure level data may then be sent at operation for conversion to device hardware, such as via Wi-Fi for example as previously described.

If a device-area-selection-auto mode is selected on a mobile phone, a generative learning app may identify an area of an image to adjust by analyzing image histogram data generated from a scanned image obtained as digital image output 114. Along those lines, image data near the edges of right and left histogram data (highlights and shadows) contribute to under- or over-exposed regions within such image.

In this example, a user can override an auto-learn mode setting by triple-tapping a touch screen display in such image display window 303 area. After such overriding, a user can either select a general-area-selection mode or a polygonal-area-selection mode, as previously described.

When adaptive filter 110 receives image selection data from an auto-learn mode, location values may be converted to image coordinate values using a combination of flood-fill algorithms and/or generative learning app input. An exposure level provided from a generative learning app used by adaptive filter 110 may be used to obtain a transmissivity value using the transmissivity value used to initialize adjustable transparency display 121 as a baseline.

For a device-area-selection-auto mode for a stand-alone image scanner, an adaptive filter 110 with a touch screen display and an off-axis camera 115 may be used. Off-axis camera 115 may perform image capture directly to adaptive filter 110 hardware for transmission as a digital image output 116.

A user can interact with a touch screen display as described above. A generative learning app may identify an area of an image to adjust by analyzing image histogram data from adaptive filter 110 hardware using a camera captured image. Image data near the edges of right and left histogram data (e.g., highlights and shadows) contribute to under- or over-exposed regions within an image. Adjustments made by a user to an adaptive filter 110 may allow an image scanner to capture an image with better balanced image areas.

As previously described, sensor array 102 may be of a DSLR camera 119 in another example. In such an example, an adaptive filter 110 may be used to control the amount of light from an image to a CCD sensor array 102 of such a camera. In this example, adaptive filter 110 may be connected to a DSLR camera 119 through a USB or other camera built-in port.

Many cameras allow development of custom applications embedded in such camera to perform image processing. Along those lines, adaptive filter 110 may include an optional camera 115 for those cameras that do not have the processing capability for an embedded application. Again, optional camera 115 may be oriented to the side of adaptive filter 110 so as not to interfere with a DSLR camera's light path.

A DSLR camera 119 may include an embedded app configured to sample an incoming image by obtaining a sampled or scanned image. Such captured image may be adjusted by using any of the above-described modes. Selected areas or image locations and corresponding exposure level data may be sent to a camera's embedded application via a USB cable for example. Along those lines, a generative-learning app may be an in-camera embedded app. A DSLR camera version of exposure correction system 100 may operate as previously described using histogram data, among other previously described details.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
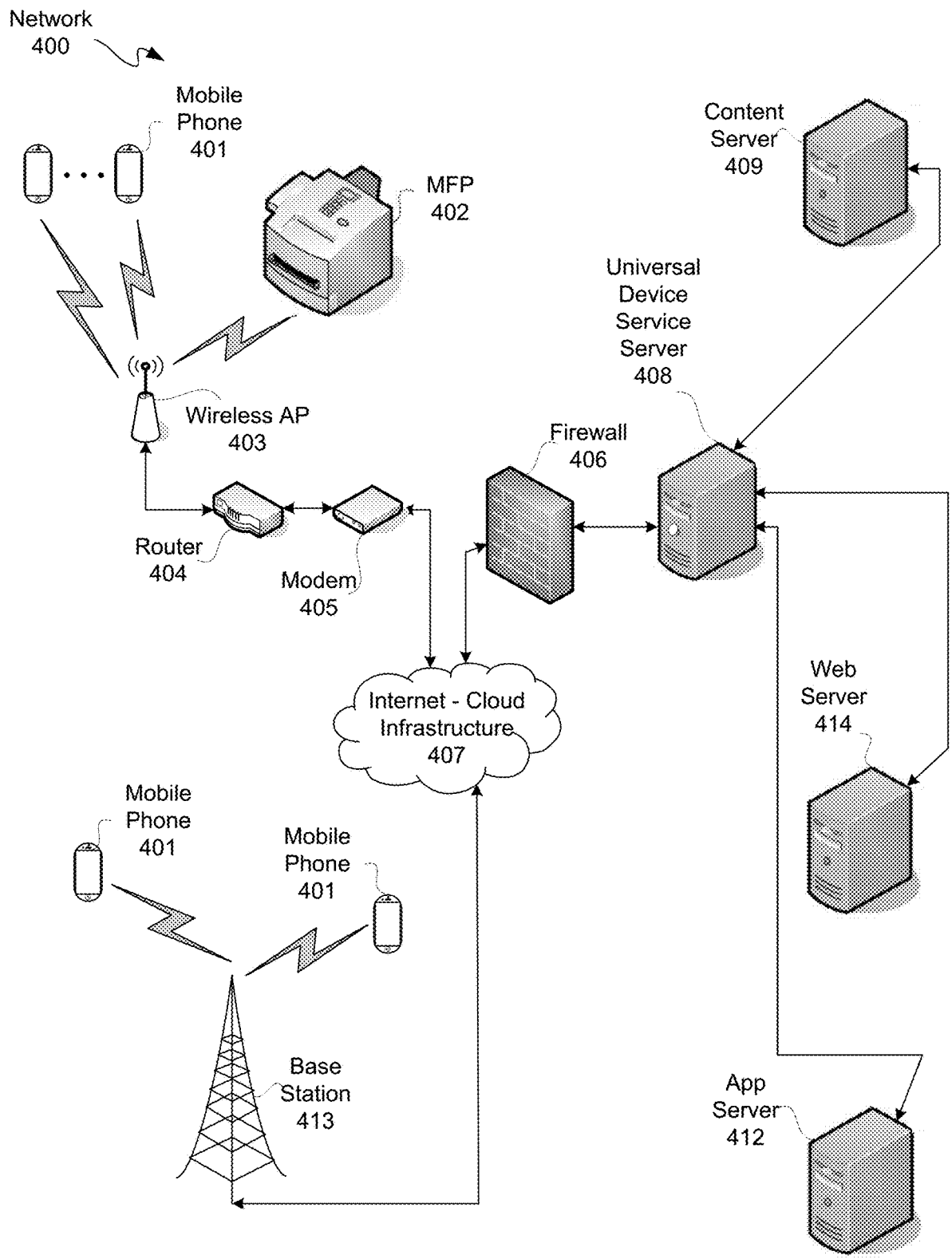
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
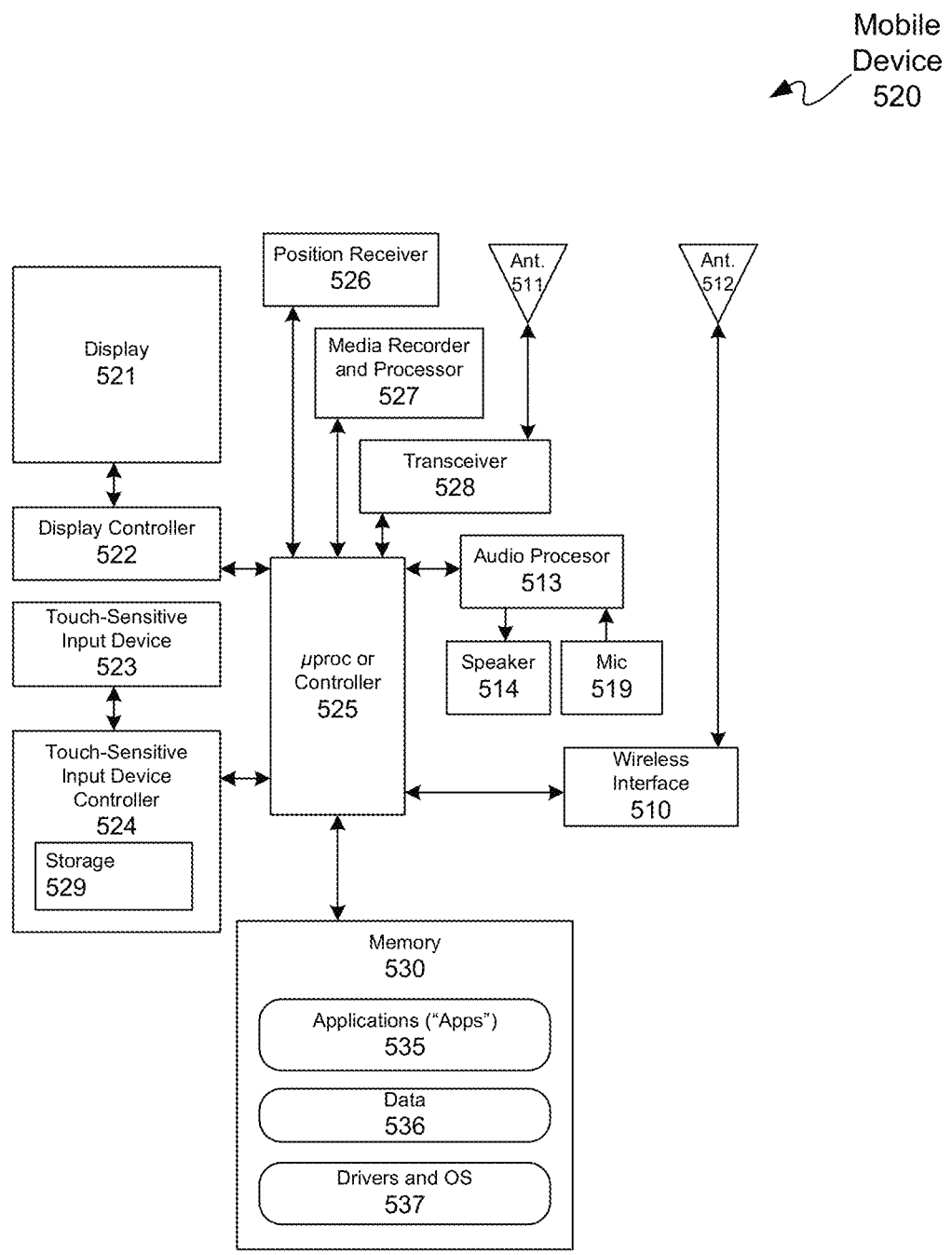
FIG. 5 is a block diagram depicting an example of a portable communication device.

FIG. 5 is a block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
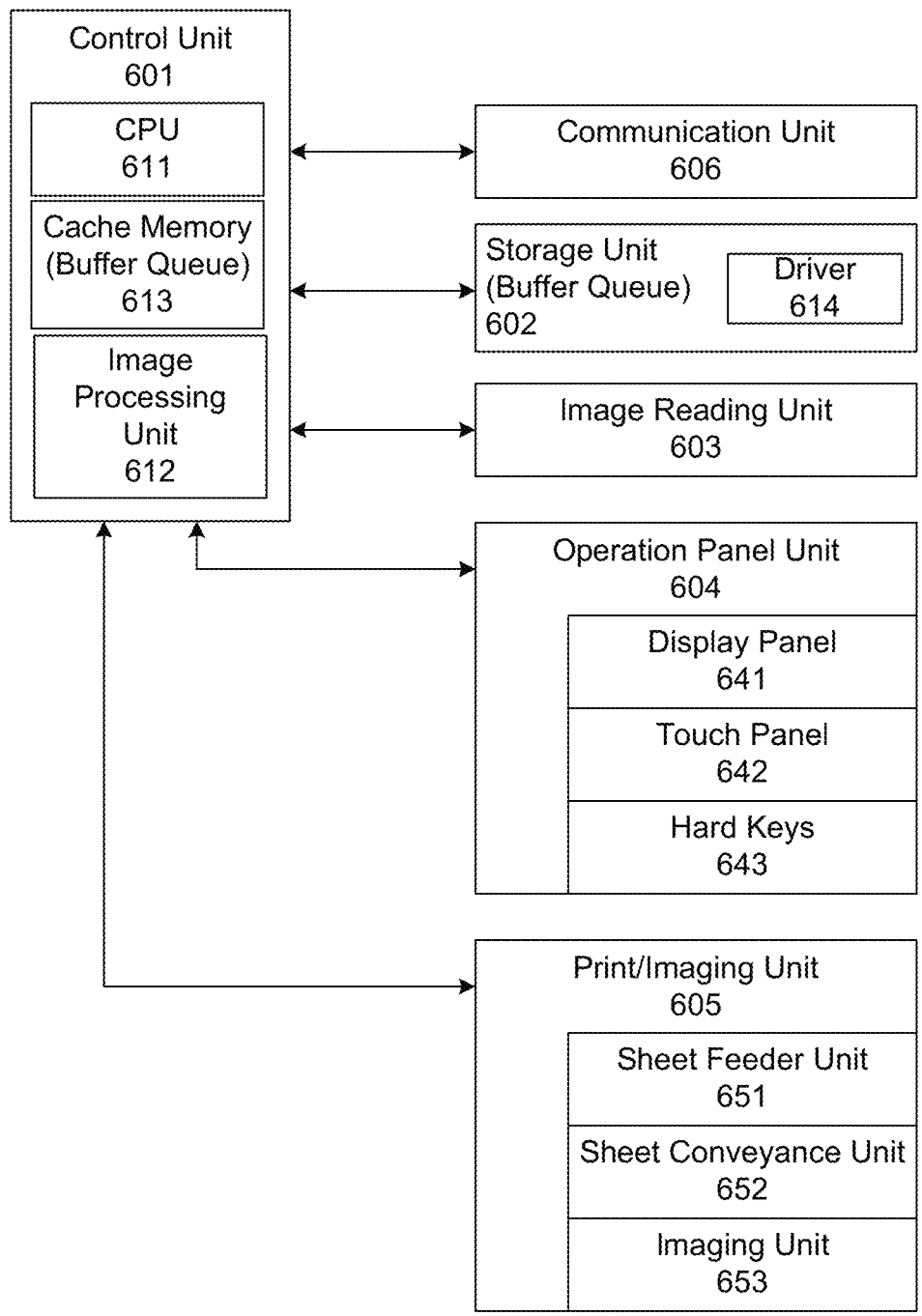
FIG. 6 is a block diagram depicting an example of a multi-function printer ("MFP").

FIG. 6 is a block diagram depicting an example of a multi-function printer (MFP) 600. MFP 600 is provided for purposes of clarity by way of non-limiting example. MFP 600 is an example of an information processing system such as for handling a printer job 101 as previously described.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer driver 614. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
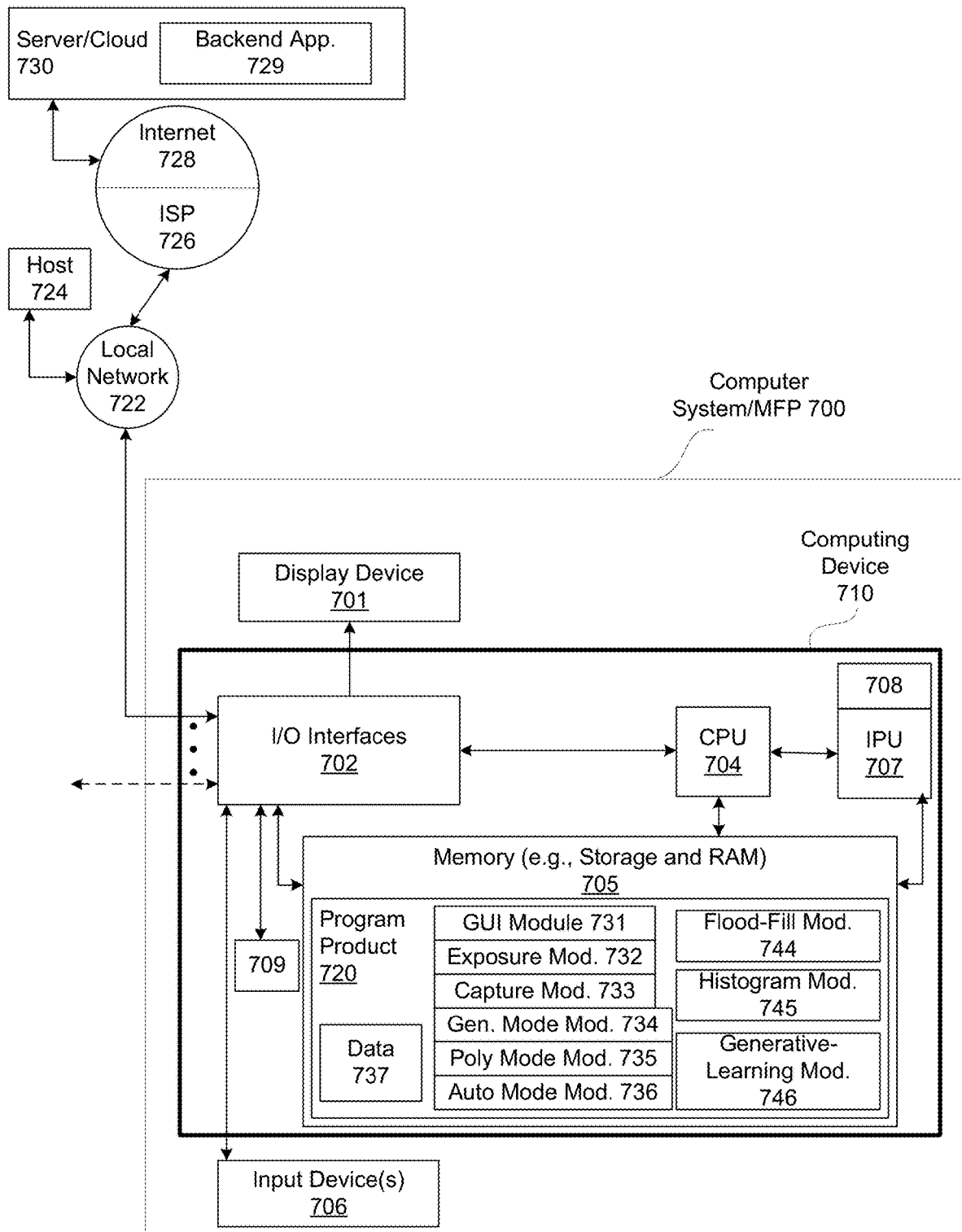
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used, including without limitation an MFP 700. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to or part of optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein.

Program product 720 may include a plurality of application modules. Such application modules may include a GUI module 731, an exposure module 732, a capture module 733, a general mode module 734, a polygonal mode module 735, and an auto mode module 736. GUI module 731 may be used for generation for display of a GUI for adjusting exposure, as described in additional detail elsewhere herein. Exposure module 732 may be for adjusting exposure of a captured image and corresponding image histogram, as described in additional detail elsewhere herein. Capture module 733 may be for capturing an image, such as from a camera or a sensor array, as described in additional detail elsewhere herein. A general mode module 734 may be for a general area selection mode, as described in additional detail elsewhere herein. A poly mode module 735 may be for a polygonal area selection mode, as described in additional detail elsewhere herein. An auto mode module 736 may be for an auto area selection mode, as described in additional detail elsewhere herein. There may be other modules, such as known social media modules for sharing images, which are not described herein for purposes of clarity and not limitation. Furthermore, modules of program product in a computer system or MFP 700 may be used in one or more other user devices, as described in additional detail elsewhere herein.

Mode modules 734 through 736 may have access to one or more of flood-fill module 744, histogram analysis module 745, or generative-learning module 746. Modules 744 through 746 may be implemented with known algorithms, and thus are not described herein in unnecessary detail. Along those lines, one or more of mode modules 734 through 736 may access stored historical data 737, which program product 720 may be configured to store in memory 705. Such stored historical data 737 may include stored historical parameters and updates thereof, such as responsive to algorithmic training to update stored historical parameters.

Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

As previously described, a UI 300 may be used for adjusting exposure. As described below in additional detail, graphical GUI examples of a UI 300 are described, each of which may be used for an image scanner, an adaptive filter, or a digital camera. Even though a GUI is described, in another example a pull-down or drop-down menu, a GUI graphic(s), a hover menu, or a combination of two or more thereof may be used in other examples.

Figures 1, 8:
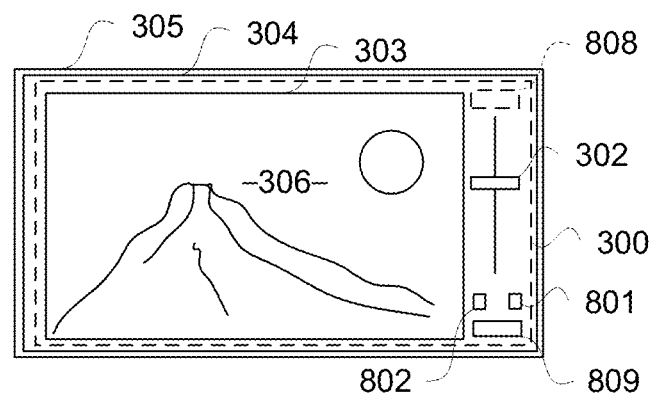
Figures 2, 8:
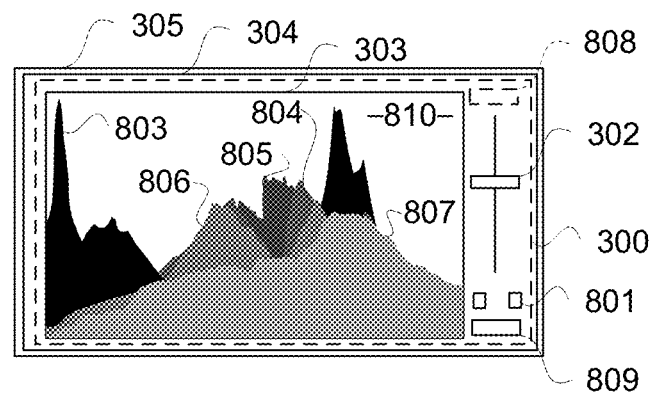
Figures 3, 8:
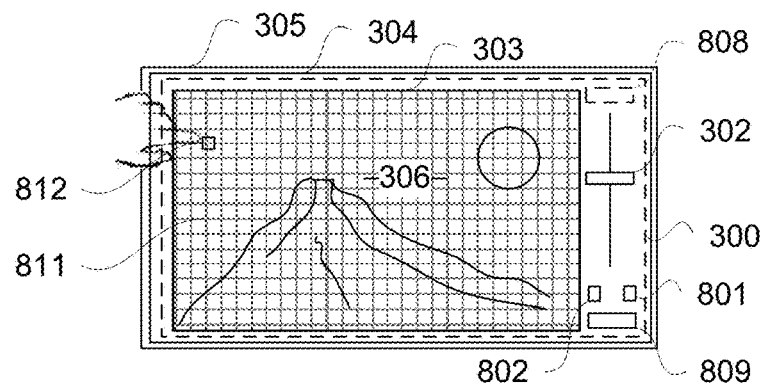
Figures 4, 8:
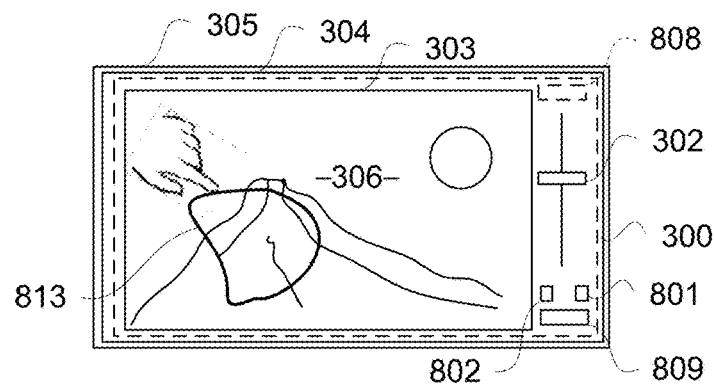
Figures 5, 8:
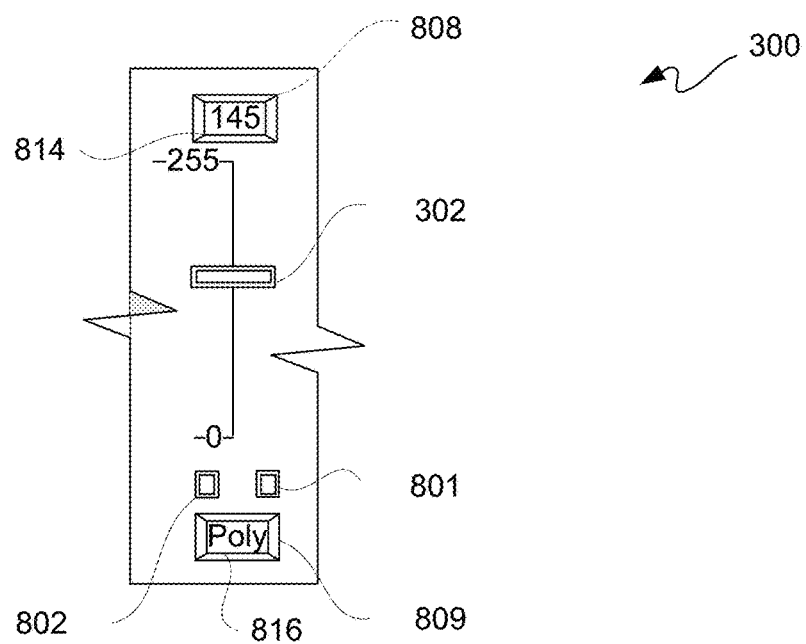

FIG. 8-1 is a block-pictorial diagram depicting another example of a UI 300. UI 300 of FIG. 8-1 is similar to that of FIG. 3, and so description of same components is not described for purposes of clarity and not limitation.

For purposes of clarity by way of example and not limitation, it is assumed that UI 300 in this example is displayed on a display of a workstation computer; however, other types of displays and computational devices may be used as previously described herein.

A screen display of UI 300 may be a data entry screen for an adaptive filter, such as adaptive filter 110 of FIG. 1-1 for example. In this example, UI 300 includes an image capture virtual button 801, an image toggle virtual button 802, an exposure virtual field-button 808, and mode select virtual field-button 809 in addition to a virtual slider 302 for controlling or affecting an input of or a change to an image displayed in image display window 303.

FIG. 8-2 is a block-pictorial diagram depicting the example of UI 300 of FIG. 8-1 with an image histogram 810 displayed in image display window 303. With simultaneous reference to FIGS. 1-1 through 8-2, UI 300 is further described.

Image histogram 810 may be an image histogram of a captured image, such as captured image 306 by camera 115 for example. Captured image 306 may be an image to be corrected for exposure. Virtual slider 302 may be slid up or down to adjust an exposure level of an entirety of a captured image 306. Furthermore, image histogram 810 may be adjusted indirectly by adjusting exposure level using virtual slider 302 on captured image 306.

In this example, virtual slider 302 may be set to an integer value from 0 to 255 in exposure virtual field-button 808. Optionally, a virtual slider 302 may have a setting thereof displayed in an exposure-level field-button 808. Optionally, a user may input a value from 0 to 255 in this example into exposure-level field-button 808 for setting an exposure level for an entirety of a captured image 306. A user may then select exposure virtual field-button 808 for setting an exposure level for an entirety of a captured image 306. A virtual slider 302 may be set to an input value input in exposure-level field-button 808.

Optionally, a virtual slider 302 may be set to an input value input in exposure-level field-button 808 to EQ for histogram equalization. For this setting, an exposure level of an entirety of captured image 306 may be set to use histogram equalization to equalize exposure level.

Setting of an exposure level of an entirety of captured image 306 assumes no mode has been selected to select a region, or auto-adjust each region, of a captured image 306. For a selected mode, a selected region of a captured image 306 may have an exposure level of such region adjusted, such as with use of virtual slider 302 and/or exposure virtual field-button 808, without affecting a remainder of a captured image 306 for such adjustment.

In this example, an image capture virtual button 801 may be used for capturing an image and displaying same in image display window 303. An image may be captured response to, and timed with, selection or assertion of image capture virtual button 801. A corresponding image histogram 810 may be captured with capture of a captured image 306. In this example, an image toggle virtual button 802 may be selected for toggling from and to a captured image 306 and a corresponding capture histogram 810 for displaying same in image display window 303.

In this example, image histogram 810 includes graphs or plots 803 through 807 for an OpenCV-python implementation. However, another implementation, including in another language, may be used in another example. In this example, a plot of an x-axis has a range from 0 to 255 values, though a subset of such range may be used. Likewise, such plot of a y-axis has a range from 0 to 255 values, with an option of using a subset of such range. In this example, an x-axis is for pixel values representing tonal variation, and a y-axis is for a number of pixels, namely a total number of pixels for each corresponding tone or color.

Again, a histogram is drawn for a grayscale image, not a color image. In this example, a sensor array has a pixel density for at least a 10-bit grayscale. More particularly, in this example, a sensor array, such as sensor array 102, has a pixel density for a 10-bit grayscale. Along those lines, there are 10 bits to represent each of three-color channels, such as blue, green, and red, and thus every pixel is represented with 30 bits, instead of 24 bits as in conventional displays. In addition to plots 803, 804, and 805 respectively representing blue, green, and red channels. For example, a captured image 306 may be loaded in its grayscale mode, and such histogram may be represented in python as:

img=cv2.imread('home.jpg',0)
hist=cv2.calcHist([img],[0],None,[256],[0,256])

There may be two additional plots 806 and 807 respectively representing contrast and brightness. A known histogram equalization may be used to improve these two variables.

However, a user may want to further improve an exposure level, namely contrast and brightness of an image. In this example, a mode select virtual field-button 809 may be used to select a general area selection mode, a polygonal area selection mode, or an auto-selection mode.

An app entry screen, such as on a display in or in communication with a workstation computer, may to allow a user to choose a mode for image area selection.

FIG. 8-3 is a block-pictorial diagram depicting the example of UI 300 of FIG. 8-1 with a grid overlay 811 on a captured image 306 displayed in image display window 303. In this example, grid overlay 811 may be toggled on and off with selection of image capture virtual button 801 after assertion of mode select virtual field-button 809. Furthermore, optionally, a user may select a granularity for grid overlay 811, such as a number of pixels in the x-direction by a number of pixels in the y-direction, which may be specified in mode select virtual field-button 809. In another example, a pull-down menu with a number of different granularity levels may be used.

For a general area selection mode, a user may select an image area, such as image area 812 for example, of a captured image 306 by touching a location in image area 812 in display window 303 of screen 304 of a touch screen display 305. In this or another example, a cursor pointing device may be used to select a location in image area 812 of display window 303. In this or another example, a user may select an image area 812 for a general area selection mode with a single tap on image area 812.

A workstation computer may be programmed with known flood-fill and histogram analysis programs, which when combined, may be used to perform selection of image areas neighboring image area 812 for adjustment. This may be used to expand a selected image area 812 for exposure level adjustment.

Contents of image area 812 may include a portion of a captured image 306 to be corrected, an image histogram therefore, an exposure field allowing a user to select a value to adjust an exposure setting for such image area 812. In this example, an integer value between 0 and 255 may be set for image area 812. Furthermore, an equalization setting may be used for a regionalized equalization of image area 812.

The above-description applies to adjustment of exposure level; however, rather than adjusting an exposure level of an entirety of a captured image 306, a regionalized exposure level adjustment of a selected image area 812 may be performed. Again, by adjusting an exposure value of an image area 812, both an entire image and corresponding image histogram may be updated to reflect such adjusted exposure value of image area 812.

A user may select a different image area by using touching or cursor pointing to select a different location on a captured image. Along those lines, a user may individually adjust exposure level for different regions of a captured image. Moreover, an equalization mode may be selected for a region for such an adjustment to such a region.

FIG. 8-4 is a block-pictorial diagram depicting the example of UI 300 of FIG. 8-1 with a user-defined selected image area 813 on a captured image 306 displayed in an image display window 303 for a polygonal area selection mode. For a polygonal area selection mode, a user may select an image area by using a touch screen or a cursor pointing device to drag their finger, stylus, or cursor pointing device to select points on such screen that form a polygonal, circular or other area that selects an image area, such as image area or region 813 for example, for image adjustment to an exposure level to such selected region.

Image area 813 may be adjusted the same as previously described for adjustment by an equalization mode or a numerical adjustment for image area 812, and so such description is not repeated for purposes of clarity and not limitation. Furthermore, in this or another example, an image area 813 adjustment may be made after entering a polygonal area selection mode by double tapping on a captured image 306.

For an auto area selection mode, an app may use flood-fill algorithms, image histogram analysis, and generative-learning techniques to perform selection of image areas, such as image areas 812 and/or 813 for example for exposure adjustment without user selection and without user intervention.

An auto area selection mode may use known generative-learning techniques to utilize stored historical parameters, such as exposure settings, image region selected, date, and algorithmic training to update parameter values, including adjusting an exposure level for each automatically identified region.

In an auto area selection mode, there is a captured image 306 and a corresponding image histogram 810. Accordingly, for each of such selections modes there may be the same content, so a user may use multiples of such modes for adjustment and then re-adjustment, whether adjusting for under- or over-exposure values. Along those lines, in an auto area selection mode, there may likewise be a selection of a value, such as for example an integer value from 0 to 255, for an exposure setting as previously described.

For each of such three modes, after adjusting one or more exposure values, an image capture virtual button 801 may be asserted again to update a captured image 306 and a corresponding image histogram 810 to reflect such one or more adjusted exposure values. Accordingly, an entire image may be adjusted one region at a time, entirely, or entirely and one region at a time. If an outcome is not acceptable to a user, a user may select smaller areas or regions of an image, such as with a polygonal selection mode for example, to fine tune. In this example, a flashing touch screen indicates that an adaptive filter 110 has completed user modifications.

FIG. 8-5 is a block-pictorial diagram depicting an enlarged view of a portion of UI 300 of FIG. 8-1. In this example, a value, which is 145 for purposes of clarity by way of example and not limitation, is displayed in a field 814 of an exposure virtual field-button 808. Again, in this example, values from 0 to 255, as well as an EQ for equalization, may be displayed in field 814.

Furthermore, in this example, a mode, which is "Poly" for a polygonal selection mode for purposes of clarity by way of example and not limitation, is displayed in a field 816 of mode select virtual field-button 809. However, as previously described, "Gen" or "Auto" may be displayed for the other two modes of the above example.

Figure 9:
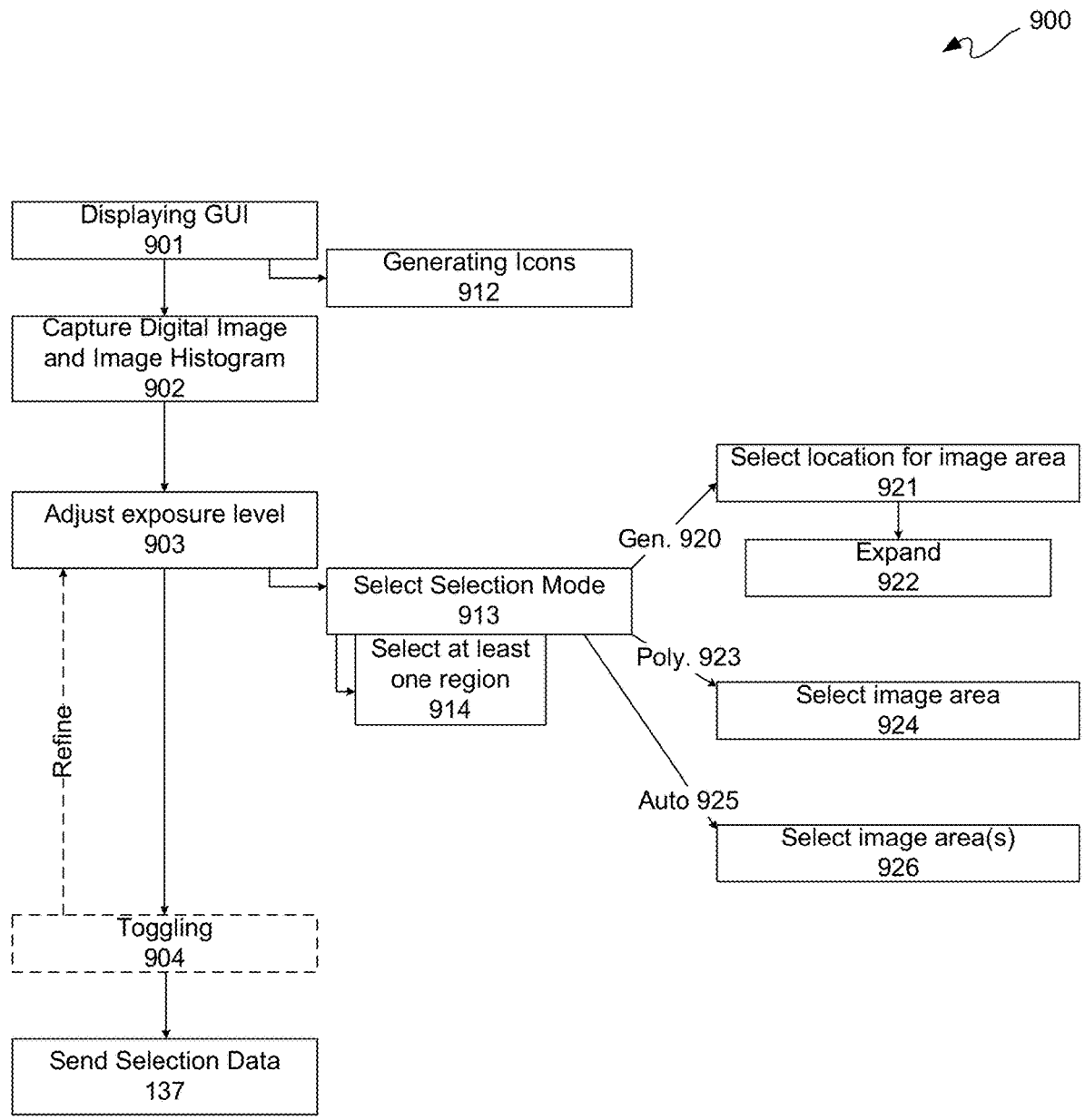
FIG. 9 is a flow diagram depicting an example of a computer-implemented image transparency exposure adjustment flow.

FIG. 9 is a flow diagram depicting an example of a computer-implemented image transparency exposure adjustment flow 900. Image transparency exposure adjustment flow 900 is further described with simultaneous reference to FIGS. 1-1 through 9.

Along those lines, image transparency exposure adjustment flow 900 may be implemented as a computer-implemented system having a display, a memory configured to store program code and data, and at least one processor of a processor system configured in response to the program code to execute machine executable instructions, as described herein.

At operation 901, a GUI, such as UI 300, may be displayed on a display. Operation 901 may include generating icons at operation 912. Generation of icons may include generating an image display window, a virtual slider, a plurality of virtual field-buttons, and a plurality of virtual buttons, as previously described herein.

At operation 902, a digital image of an image transparency may be captured, along with an image histogram of such captured digital image, responsive to assertion of an image capture button of a plurality of virtual buttons, as previously described herein. Along those lines, such assertion may trigger previously described operation 133 and sending at operation 134.

At operation 903, an exposure level of at least one region of a captured digital image may be adjusted responsive to a setting of a virtual slider or an exposure virtual field-button of a plurality of virtual field-buttons to adjust a transparency level of an adaptive filter 110. Setting of a virtual slider or an exposure level, such as from 0 to 255 or EQ in the above-described example, may be for an entirety of a captured image at operation 903 and/or at least one region thereof. With respect to the latter, At operation 913 of operation 903, a selection mode of a plurality of selections modes may be selected responsive to assertion of a mode select virtual field-button of a plurality of virtual field-buttons. In this or another example, such selection at operation 913 of a selection mode of a plurality of selections modes may be responsive to assertion of one or more taps on a touch screen in an image display window, such as previously described. Such mode selection may be in accordance with operation 136. Further, at operation 914 of operation 913, at least one region may be selected for or by a selection mode selected at operation 913.

Again, selections modes may include a general area selection mode 920, a polygonal area selection mode 923, and an auto area selection mode 925. For a general area selection mode 920, at operation 921 a location for an image area may be selected at such location on a captured digital image for at least one region. At operation 922, such location may be expanded to provide a selected image area. Such expansion may be responsive to flood-fill and histogram analysis.

For a polygonal area selection mode 923, at operation 924 an image area of a captured digital image may be selected responsive to a user-defined area located on a captured digital image for at least one region. Such user-defined area may by finger or cursor pointing device, such as described for example for image area or region 813.

For an auto area selection mode 925, at operation 926 one or more image areas or regions of a captured digital image may be selected responsive flood-fill algorithms, image histogram analysis, and generative learning for such at least one region. Along those lines, adjusting each such image area at operation 903 may be responsive to stored historical parameters and algorithmic training to update such stored historical parameters.

Optionally, at operation 904, a user may toggle from display of a captured digital image in an image display window to display of an image histogram therefor responsive to assertion of an image toggle button of a plurality of virtual buttons. This toggling may be used to see an adjustment to an image histogram corresponding to an exposure level adjustment in a captured digital image. Along those lines, a user may optionally decide to refine an in-process work product by re-adjusting at operation 903.

Once a user is okay with an in-process work product, selection data, including any and all exposure level adjustments, may be sent to adaptive filter 110 for obtaining an exposure-level corrected transparency for imaging onto a sensor array 102. However, if a user is still not satisfied with a digital image resolved or captured by sensor array 102, such digital image captured by sensor array 102 may be used as a captured digital image at operation 902, along with a corresponding image histogram, and adjustment of exposure level at operation 903 may be repeated.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A system for exposure correction of an image transparency, comprising:
    a light source;
    an adaptive filter having an adjustable transparency panel and a microcontroller coupled for communication with the adjustable transparency panel to adjust a transparency level of the adjustable transparency panel;
    a transparency holder positioned between the light source and the adaptive filter;
    the transparency holder configured to hold the image transparency backlit by light from the light source to obtain first analog image information;
    the adaptive filter configured to sense an exposure level associated with the first analog image information to provide a sensed signal to the microcontroller;
    the microcontroller configured to adjust the transparency level of the adjustable transparency panel responsive to the sensed signal; and
    a sensor array configured to receive second analog image information output from the adjustable transparency panel;
    wherein the second analog image information is the first analog image information after being adjusted by the adjustable transparency panel.

2. The system according to claim 1, further comprising a programmed computing device in communication with the adaptive filter for selecting a region of the first analog image information to adjust exposure thereof.

3. The system according to claim 2, wherein the adjustable transparency panel is a transparent organic light-emitting diode panel.

4. The system according to claim 1, further comprising a scanner having the sensor array.

5. The system according to claim 4, wherein the scanner is of a printing device.

6. The system according to claim 5, wherein the printing device is a multi-function printer.

7. The system according to claim 1, further comprising a camera having the sensor array.

8. The system according to claim 1, wherein the transparency holder is positioned between the adjustable transparency panel and the light source.

9. The system according to claim 1, wherein the microcontroller is configured to adjust the transparency level of the adjustable transparency panel and a power level of the light source responsive to the sensed signal.

10. The system according to claim 9, wherein the sensor array has a pixel density for at least a 10-bit gray scale.

11. A method for exposure correction of an image transparency, comprising:
    obtaining an adaptable filter having an adjustable transparency panel and a microcontroller;
    backlighting the image transparency to obtain first analog image information by the adaptable filter;
    sensing an exposure level associated with the first analog image information;
    adjusting a transparency level of the adjustable transparency panel responsive to the sensed exposure level; and
    obtaining second analog image information from the adjustable transparency panel provided to a sensor array; and
    wherein the second analog image information is the first analog image information with the adjusted transparency level.

12. The method according to claim 11, further comprising programming a computing device in communication with the adaptive filter for selecting a region of the first analog image information to adjust exposure thereof.

13. The method according to claim 12, wherein the adjustable transparency panel is a transparent organic light-emitting diode panel.

14. The method according to claim 11, further comprising scanning with a scanner having the sensor array to obtain the second analog information by the sensor array.

15. The method according to claim 14, wherein the scanner is of a printing device.

16. The method according to claim 15, wherein the printing device is a multi-function printer.

17. The method according to claim 11, further comprising sampling with a camera having the sensor array to obtain the second analog information by the sensor array.

18. The method according to claim 11, further comprising positioning the transparency holder between the adjustable transparency panel and the light source.

19. The method according to claim 11, further comprising adjusting by the microcontroller the transparency level of the adjustable transparency panel and a power level of the light source responsive to the sensed signal.

20. The method according to claim 19, wherein the sensor array has a pixel density for at least a 10-bit gray scale.

* * * * *